United States Patent

[11] 3,594,630

| [72] | Inventor | George H. Studtmann |
| | | Mount Prospect, Ill. |
| [21] | Appl. No. | 874,553 |
| [22] | Filed | Nov. 6, 1969 |
| [45] | Patented | July 20, 1971 |
| [73] | Assignee | Borg-Warner Corporation |
| | | Chicago, Ill. |

[54] COMMUTATION CIRCUIT FOR SCR'S
10 Claims, 12 Drawing Figs.

[52] U.S. Cl. ................................................ 321/45 R, 321/45 C
[51] Int. Cl. ............................................ H02m 7/48
[50] Field of Search ........................................ 321/43- —45, 45 C

[56] References Cited
UNITED STATES PATENTS

| 3,263,152 | 7/1966 | Walker | 321/45 |
| 3,278,827 | 10/1966 | Corey et al. | 321/44 |
| 3,311,809 | 3/1967 | Corey et al. | 321/45 |
| 3,406,327 | 10/1968 | Mapham et al. | 321/45 |
| 3,432,740 | 3/1969 | Morgan | 321/44 X |
| 3,465,233 | 9/1969 | Johnston et al. | 321/45 |
| 3,487,278 | 12/1969 | Turnbull et al. | 321/45 X |

Primary Examiner—William M. Shoop, Jr.
Attorneys—Donald W. Banner, William S. McCurry and John W. Butcher ABSTRACT: An inverter circuit includes a pair of conventional commutating capacitors, coupled in series between the input conductors. Additional pair of commutating capacitors is provided, and an inductor is coupled between the common connection of the additional capacitors and the common connection of the conventional commutating capacitors.

PATENTED JUL20 1971 3,594,630

Inventor
George H. Studtmann

By James J. Jennings, Jr.
Attorney

Inventor
George H. Studtmann
By James J. Jennings, Jr.
Attorney

Inventor
George H. Studtmann
By James J. Jennings, Jr.
Attorney

COMMUTATION CIRCUIT FOR SCR'S

BACKGROUND OF THE INVENTION

In the inverter field semiconductor switches such as silicon controlled rectifiers (SCR's) are frequently connected for selective conduction, to provide an AC output voltage from a DC input circuit. To turn off or commutate an SCR, generally a reverse voltage is applied across the anode and cathode of the previously conducting SCR. The reverse voltage is of an appropriate polarity and time duration to turn off the SCR and allow it to regain its blocking stage. One way this turnoff is accomplished is to charge a commutating capacitor, which is normally coupled in parallel with an associated SCR and one winding of the commutating choke. When this SCR is gated on, the energy stored in the commutating capacitor rapidly discharges through the gated-on SCR and associated commutating choke winding, inducing a voltage by transformer action across the other commutating choke winding to provide a turnoff voltage for the previously conducting SCR. Various techniques have been utilized in an attempt to recover the energy utilized to provide effective commutation and minimum heating of the SCR's.

One improvement in commutating energy recovery is disclosed and claimed in U.S. Pat. No. 3,308,371 Studtmann, entitled "Static Inverter System With Energy Return Circuit," which issued Mar. 7, 1967 to the assignee of this invention. The patent teaches the recovery of the commutating energy either by a recovery circuit coupled to the commutating choke windings, or over a spillover transformer coupled in series with the load conductor, or utilizing both circuits. A further and substantial improvement in this art is described and claimed in U.S. Pat. No. 3,349,315 Studtmann, entitled "Static Inverter System With Current Sharing By Both Commutating Choke Windings During Commutating Energy Recovery," which issued Oct. 24, 1967 to the assignee of this invention. As the title implies, the commutating choke winding from which the load current is transferred at the beginning of commutation is "put to work" or made to share the commutating energy, to minimize the current through each of the commutating choke windings during the commutation interval. These significant improvements have to do with recovery of the commutating energy after it has been "dumped" into the commutating choke to effect a commutation of the SCR's. However to date little progress has been made in attempts to significantly reduce the amount of energy utilized to achieve effective commutation.

It is therefore a primary consideration of this invention to provide a commutating circuit for an inverter which utilizes substantially less energy than previously expended and still produces effective commutation.

SUMMARY OF THE INVENTION

An inverter circuit connected in accordance with the present invention comprises a pair of input conductors for receiving a first DC voltage. A power transfer circuit coupled between the input conductors includes at least one SCR. A commutating circuit is coupled to the SCR, and includes means for receiving a second DC voltage, which may or may not be derived from the first DC voltage. Switching means is provided for applying the second DC voltage to the SCR as a commutating pulse, that is, in the appropriate sense and for the requisite time period to commutate the SCR. Particularly in accordance with this invention, circuit means is provided to shape the commutating pulse so as to minimize the amount of energy expended in commutating the SCR.

In a preferred embodiment of the invention such circuit means in the commutating circuit comprises a first capacitor with an inductor having one end coupled to one plate of the first capacitor. A second capacitor is also provided, having one plate coupled to the other end of the inductor and the other plate coupled to the other plate of the first capacitor. Initially the capacitors are charged to approximately the level of the second DC voltage. Upon actuation of the switching means in the commutation circuit, the first commutating capacitor initially discharges as discharge of the second capacitor is retarded by the inductor. Thereafter, the second commutating capacitor also discharges to augment the first capacitor discharge in providing the commutating pulse with minimum energy expenditure.

THE DRAWINGS

In the several figures of the drawings like reference numerals identify like elements, and in the drawings.

GENERAL INVERTER OPERATION

Figure 1:
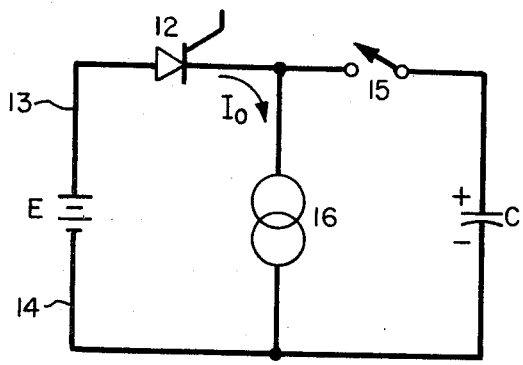
FIG. 1 is a schematic representation.

By way of general explanation, an SCR 12 is shown in FIG. 1 coupled between an input conductor 13 and a normally open switch 15. A battery supplying a potential E is coupled between input conductors 13, 14. The symbol referenced 16 denotes a current generator. A current referenced $I_o$ flows through SCR 12 when the circuit is energized. A capacitor C is coupled between the movable contact of switch 15 and conductor 14. When the current flowing through the SCR is supplying a reactive load, such as a motor, the reactive circuit tends to keep the current flowing even when the SCR is commutated. Hence in considering the inverter operation the current $I_o$ is considered to be maintained, as represented by the current generator 16, just before and just after SCR is commutated off.

Figure 2:
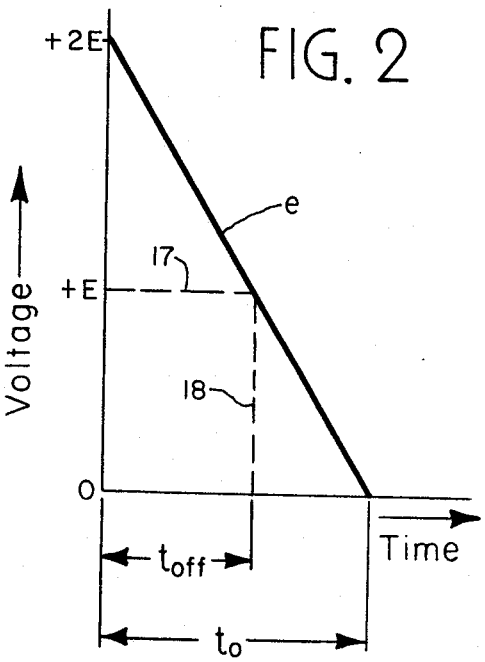
FIGS. 2 and 3 are graphical illustrations, useful in understanding the general commutation problem.

Assuming that the capacitor C is charged to a voltage 2E, twice that of the battery or input voltage, with the polarity indicated in FIG. 1, when switch 15 is closed this accumulated voltage is placed across the series circuit of the SCR and the supply battery so that the net voltage across SCR 12 is −E. Considering the voltage supplied from the capacitor as that denoted $e$ in FIG. 2, this voltage gradually decays as shown by the curve. At some time $t$ the voltage on capacitor C has decayed below the battery voltage and at this time the SCR 12 is no longer back biased. It is requisite that the voltage supplied by the commutating circuit, whether a capacitor or other arrangement, be greater than +E and of the appropriate sense to back bias the SCR for at least the time period $t_{off}$ which is equal to the device turnoff time. The amount of energy U which flows into the load 16 during the commutation interval is given by $$U = I_0 \int_0^{t_o} e\, dt.$$

Figure 3:
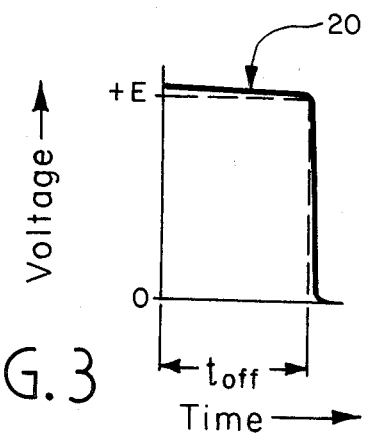

This energy must come from the capacitor C and hence represents the amount of energy initially stored prior to Commutation. To reduce the stored energy required for commutation it is then apparent that the volt-time integral must be reduced. The theoretical volt-time integral which can be used and still provide effective commutation is that represented by the dashed lines 17 and 18 in FIG. 2. However in practice it must be remembered that the actual commutating voltage cannot provide too high a $dv./dt.$ across the SCR, and in addition the commutating voltage must be at least slightly greater than +E to provide a small reverse bias which improves the turnoff time. It is in the reduction of the commutating energy required, from a curve such as $e$ in FIG. 2 to one more nearly approximating the curve in FIG. 3, that the present invention is principally directed.

Figure 4:
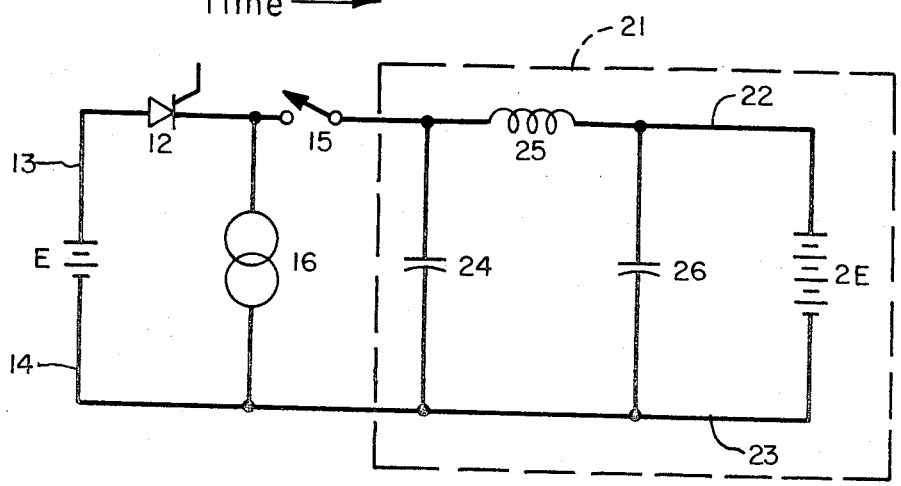
FIGS. 4 and 5 are schematic illustrations useful in understanding the widespread applicability of this invention.

FIG. 4 depicts one embodiment of the invention, broadly applied to commutate SCR 12 off with a minimum energy expenditure. As there shown the commutating circuit 21 is generally represented within the broken lines, and includes a pair of conductors or circuit means 22, 23 for receiving the second DC voltage of a level 2E. Those skilled in the art will appreciate that this second DC voltage need not be precisely twice that of the first battery E but must be greater than the first DC voltage E to insure that SCR 12 will be held back-biased for the requisite turn off time $t_{off}$. Switch 15 represents a switching means for applying the second DC voltage to the SCR 12 for commutation. In the embodiment of FIG. 4, the circuit means for shaping or producing the desired commutating pulse includes a first capacitor 24, and an inductor 25 having one end coupled to one plate of the first capacitor 24. A second capacitor 26 has one plate coupled to the other end of the inductor 25, and its other plate coupled over conductor 23 to the other plate of capacitor 24.

With switch 15 open as shown, capacitor 24, 26 are charged to approximately the voltage level 2E. Upon closure of switch 15, capacitor 24 initially commences to discharge in the reverse direction over switch 15 through SCR 12, but capacitor 26 cannot discharge at the same rate because of the retarding action of the inductor 25. In one sense it is appropriate (although not literally correct) to describe the discharge action as capacitor 24 "first" discharging to maintain the holdoff voltage. Those skilled in the art will appreciate that the discharge of both capacitors is simultaneous, but the discharge current of capacitor 24 is initially higher than that of capacitor 26. With this arrangement the commutating pulse of holdoff voltage is "shaped" to minimize the amount of energy expended in the commutation process.

Figure 5:
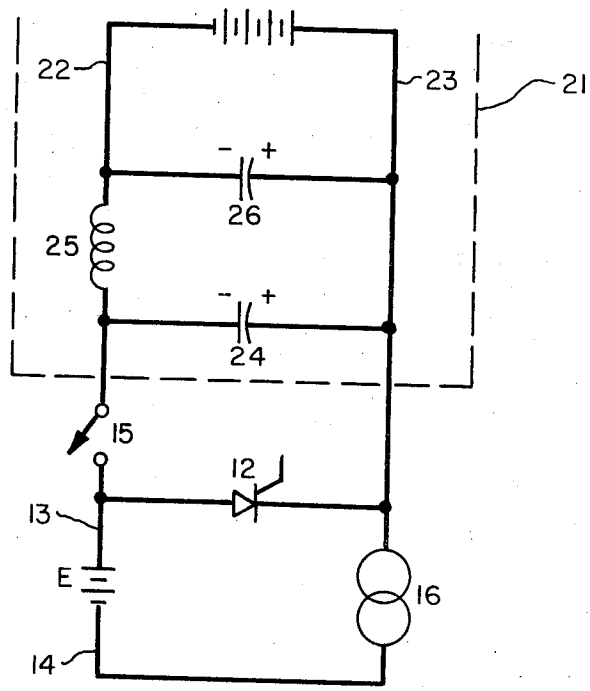

FIG. 5 is generally similar to FIG. 4 but shows that the commutating circuit 21 can be coupled directly across the SCR 12 instead of across SCR 12 and the energizing battery E as shown in FIG. 4.

Figure 6:
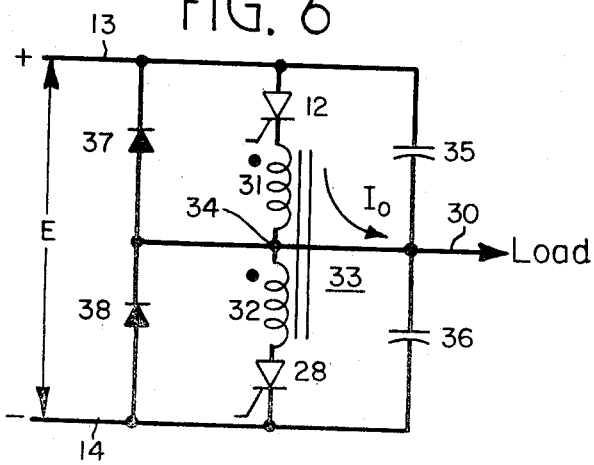
FIG. 6 is a schematic diagram of a known inverter circuit.

Considering now the known configuration of one leg of a bridge inverter as depicted in FIG. 6, a pair of input conductors 13, 14 receives an energizing DC potential E. SCR's 12, 28 are gated to conduct alternately and energize the load (not shown) coupled to output conductor 30. The SCR's are coupled in a series circuit between input conductors 13, 14. This series circuit comprises first SCR 12, first and second windings 31 and 32 of a commutating choke assembly 33, and second SCR 28. The common connection between the first and second choke windings 31, 32 is referenced 34. First and second commutating capacitors 35, 36 are coupled in series between input conductors 13, 14. The common connection between these commutating capacitors is coupled to common connection 34 between the choke windings 31, 32. A pair of energy return diodes 37, 38 are coupled in series between the input conductors 13, 14.

Assuming that at a given moment a unidirectional potential E is applied between conductors 13, 14 and that SCR 12 is conducting, a load current $I_o$ flows from conductor 13 through SCR 12, choke winding 31, and over conductor 30 to the load. With SCR 12 conducting, a virtual short circuit appears across capacitor 35 which is not charged. Capacitor 36, with SCR 28 nonconductive, is charged to substantially the input DC voltage E.

Figure 7:
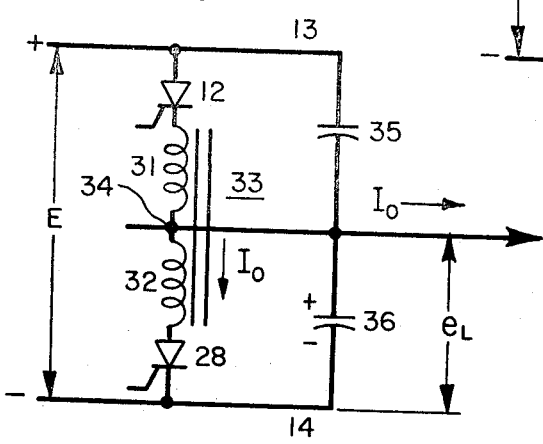
FIG. 7 is a partial schematic diagram.
Figure 8:
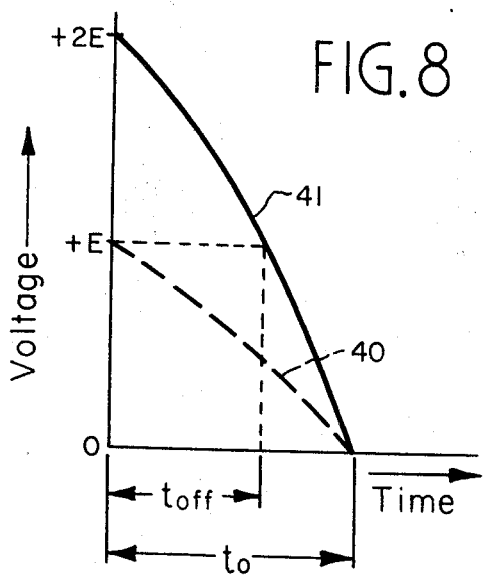
FIG. 8 is a graphical illustration, useful in understanding the general commutation operation.

Assuming now it is desired to gate on SCR 28 and commutate off SCR 12, an appropriate gating pulse is applied between the gate and cathode of SCR 28 to turn this semiconductor on. For a reasonably inductive load (such as a motor) energized over output conductor 30, it can be assumed that the load current $I_o$ remains substantially constant during the brief commutation interval. This is represented in FIG. 7, and at the same time the load current $I_o$ has been transferred, by reason of the magnetic coupling between windings 31 and 32 of the commutating choke 33, from winding 31 to winding 32. Capacitor 36, previously charged with the polarity indicated in FIG. 7 to the DC voltage E, then discharges through the series circuit including winding 32 and SCR 28. It is apparent from the circuit that an additional discharge path for capacitor 36 is provided as $I_o$ flows to the load. At the same time capacitor 35 is charging as the charge current flows from conductor 13 through capacitor 35. Some of the charge current flows through winding 32 and SCR 28 to conductor 14, and the remainder of the charge current flows over load conductor 30 to the load. The combination of discharge and charge currents produces a turnoff pulse across winding 32 as depicted by the curve 40 in FIG. 8. By transformer action of the commutating choke the voltage +E is raised to +2E, producing an effective turnoff pulse as represented by curve 41. The turnoff pulse voltage minus the battery or energizing voltage initially provides a net reverse bias voltage of −E. The turnoff time $t_{off}$ ends when the turnoff pulse 41 decays to a level +E. The entire time interval $t_o$ until the discharge pulse terminates is also indicated in FIG. 8.

It can be demonstrated that with a bridge inverter as shown having a center-tapped commutating choke, the total energy U expended to hold off the SCR for a specified time $t_{off}$, using an arbitrary voltage generator $e_L(t)$ is given by the function $$U = 2I_o \int_0^{t_o} e_L(t)dt + \frac{1}{2L}\left[\int_0^{t_o} e_L(t)dt\right]^2$$

where $e_L(t)$ represents the voltage applied across one-half of the inductor, for example across winding 32 in FIG. 7. For successful commutation of the other SCR 12 the voltage $e_L(t)$ must equal or exceed the value +E for at least the time interval $t_{off}$. From the function given above it is manifest that the amount of turnoff energy U decreases as the volt-second integral of the turnoff pulse decreases. For the particular circuit of FIG. 7 the turnoff pulse is represented by curve 40 in FIG. 8, and the integral is represented by a summation of all the area under the curve 40. Thus the principal consideration of this invention is to reduce the turnoff energy related to the value of this integral, or the extent of the area under curve 40.

DETAILED DESCRIPTION OF THE INVENTION

Figure 9:
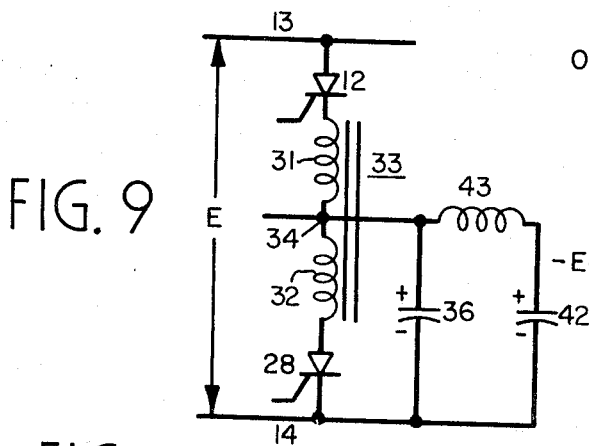
FIG. 9 is a schematic diagram illustrating an improved commutation circuit connected in accordance with this invention.

In accordance with the present invention, the amount of energy required for effective commutation can be substantially reduced by utilizing the network depicted in FIG. 9. As there shown a second commutating capacitor 42 has one side coupled to input conductor 14, and the other side coupled through a first inductor 43 to the top of capacitor 36 and to common connection 34. With this arrangement, the turn-on pulse applied to SCR 28 initially completes a path for capacitor discharge through winding 32 and SCR 28. The transformer action of commutating choke 33 provides a voltage of +2E at the cathode of SCR 12, represented as the uppermost value in FIG. 10. With a voltage of +E applied to the anode over conductor 13, SCR 12 is effectively back-biased by a voltage of −E. Curve 44 at the lower part of FIG. 10 represents the decay of the back-bias voltage.

Figure 10:
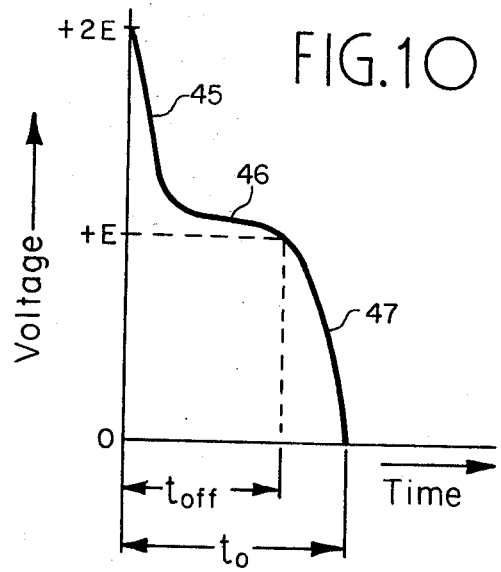
FIG. 10 is a graphical illustration, to assist in understanding the improvement achieved by the present invention.

As SCR 28 begins to conduct, there is initially a rapid decay of the voltage on capacitor 36, represented by the first portion 45 of the upper curve in FIG. 10. During this initial rapid discharge of capacitor 36 through winding 32 and SCR 28, the energy in second capacitor 42 is momentarily held back or retarded by inductor 43. With appropriate design of this inductor 43, it thereafter "allows" capacitor 42 to discharge through inductor 43 and winding 32 at a rate such that the voltage at common connection 34 is maintained slightly greater than +E, represented by the portion 46 of the curve in FIG. 10, for the time interval $t_{off}$. Finally both capacitors 42 and 36 discharge substantially completely as represented by the portion 47 of the waveform in FIG. 10.

Figure 11:
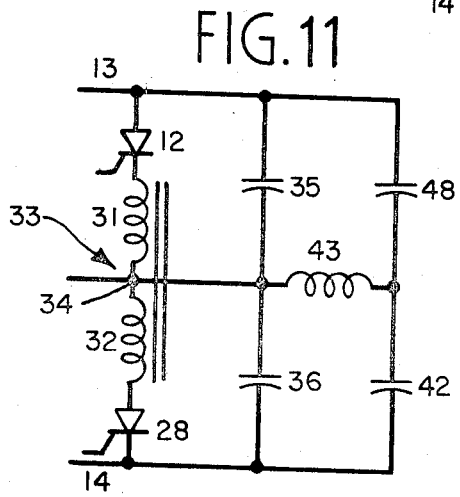
FIG. 11 is a schematic diagram of a preferred embodiment of this invention.

Those skilled in the art will appreciate the turnoff time obtained for the SCR's shown in FIG. 9, achieved by the delayline components 36, 43 and 42, is substantially the same as that for the circuit depicted in FIG. 11. The capacitor size is "split", so that the values of capacitors 35 and 36 in FIG. 11 when added equal the value of the single capacitor 36 in FIG. 9. Such circuit design is now well understood in this art and requires no explanation at this point.

Figure 12:
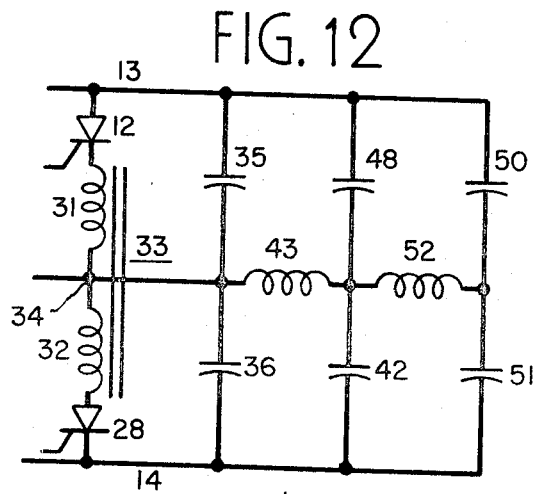
FIG. 12 is a schematic diagram of another embodiment of the present invention.

With the arrangement depicted in FIG. 11, comparisons were made with conventional inverter arrangements such as that shown in FIG. 6. With both arrangements the value of E was 300 volts, and the load current $I_o$ was 6.4 amperes. Each choke winding 31, 32 had an inductance value of 832 microhenries. In the arrangement of FIG. 6, each commutating capacitor 35, 36 had a value of 2 microfarads. With the circuit of FIG. 11, each commutating capacitor 35, 36 had a value of 0.416 microfarads, and each of the third and fourth commutating capacitors 42, 48 had a value of 0.918 microfarads. The first inductor 43 was a 66.5 microhenries choke. By evaluating the operation of the different circuits, it was found that reductions of 30 percent were obtained in the amount of energy required for effective commutation, utilizing only one additional section of the delay line-type commutating circuit as shown in FIG. 11. Even more improvement is obtainable with additional sections. For example a reduction of 35 percent can be achieved with the additional section as shown in FIG. 12, utilizing the fifth and sixth capacitors 50, 51 and the second inductor 52. However it is manifest that the principal energy reduction is achieved with the single section as explained in connection with FIG. 9 and depicted in detail in FIG. 11.

While only particular embodiments of the invention have been shown and described, it will be apparent to those skilled in the art that various changes and modifications may be made therein without departing from the invention in its broader aspects. For example although the additional commutating capacitors are illustrated as connected to the same input conductors which energize the inverter, it is manifest that the commutating capacitors can also be coupled to separate energizing conductors as is sometimes done in "precharge" circuits. Therefore the aim in the appended claims is to cover all such changes and modifications as may fall within the true spirit and scope of the invention.

What I claim is:

1. An inverter circuit comprising
 a pair of input conductors for receiving a unidirectional energizing potential,
 a series circuit coupled between the input conductors comprising at least one SCR, a commutating choke assembly having first and second windings electrically and magnetically coupled to each other, with a common connection between the first and second windings,
 a first commutating capacitor coupled between one of the input conductors and said common connection, a second commutating capacitor coupled to said one input conductor, and a first inductor, coupled between said common connection and the second commutating capacitor, such that in the commutation of the SCR, the first commutating capacitor initially discharges through one of the commutating choke windings, and thereafter the second commutating capacitor discharges through the inductor and said one winding of the commutating choke.

2. An inverter circuit as claimed in claim 1 and further comprising a third commutating capacitor coupled to said one input conductor, and a second inductor, coupled between said third commutating capacitor and the common connection between the first inductor and the second commutating capacitor, further to reduce the amount of energy required to commutate the SCR.

3. In an inverter circuit comprising a pair of input conductors for receiving a unidirectional energizing potential,
 a series circuit coupled between the input conductors comprising a first SCR, a commutating choke assembly having first and second windings electrically and magnetically coupled to each other, with a common connection between the first and second windings, and a second SCR,
 a first commutating capacitor coupled between one of the input conductors and said common connection, a second commutating capacitor coupled between said common connection and the other of the input conductors,
 third and fourth commutating capacitors coupled in series between the input conductors, and a first inductor coupled between said common connection and a common connection between the third and fourth commutating capacitors, such that upon conduction of one SCR, one of the first and second commutating capacitors initially discharges through the associated commutating choke winding, and thereafter the corresponding one of the third and fourth commutating capacitors discharges through the first inductor and said associated commutating choke winding.

4. An inverter circuit as claimed in claim 3 and further comprising fifth and sixth commutating capacitors coupled in series between the input conductors, and a second inductor coupled between the common connection of the fifth and sixth commutating capacitors and the common connection between the third and fourth commutating capacitors, further to decrease the amount of energy required to commutate one of the SCR's.

5. An inverter circuit connected for energization over a pair of input conductors, comprising
 a series circuit coupled between the input conductors, including a first silicon controlled rectifier, a second silicon controlled rectifier, and a commutating choke assembly having first and second windings electrically and magnetically coupled to each other,
 a first commutating capacitor, connected to receive energy over a first energizing conductor and, upon gating on of the first silicon controlled rectifier, to discharge the stored energy into the first commutating choke winding,
 a second commutating capacitor, connected to receive energy over a second energizing conductor and, upon gating on of the second silicon controlled rectifier, to discharge the stored energy into the second commutating choke winding, and
 third and fourth commutating capacitors coupled in series between the energizing conductors, and a first inductor coupled between the common connection of the third and fourth commutating capacitors and the first and second commutating capacitors, such that upon conduction of one silicon controlled rectifier, one of the first and second commutating capacitors initially discharges through the associated commutating choke winding, and thereafter the corresponding one of the third and fourth commutating capacitors discharges through the first inductor and said associated commutating choke winding.

6. An inverter circuit as claimed in claim 5 and further comprising fifth and sixth commutating capacitors coupled in series between the energizing conductors, and a second inductor coupled between the common connection of the fifth and sixth commutating capacitors and the common connection between the third and fourth commutating capacitors, further to decrease the amount of energy required to commutate one of the silicon controlled rectifiers.

7. An inverter circuit comprising
 a pair of input conductors for receiving a first DC voltage,
 a power transfer circuit including at least one SCR coupled between the input conductors, and
 a commutating circuit, coupled to said SCR, comprising means for receiving a second DC voltage, switching means for applying said second DC voltage to the SCR as a commutating pulse in the appropriate sense to commutate the SCR, and circuit means for shaping the commutating pulse to minimize the amount of energy expended in the commutation.

8. An inverter circuit as claimed in claim 7 in which the circuit means in the commutating circuit comprises a first capacitor, an inductor having one end coupled to one plate of the first capacitor and a second capacitor having one plate coupled to the other end of the inductor and the other plate coupled to the other plate of the first capacitor, which capacitors are charged to approximately the second DC voltage level prior to actuation of the switching means such that upon actuation of the switching means, the first commutating capacitor initially discharges as the inductor retards discharge of the second capacitor, and thereafter the second commutating capacitor discharges.

9. An inverter circuit comprising a pair of input conductors for receiving a unidirectional energizing potential, a series circuit coupled between the input conductors comprising at least one SCR, a commutating choke assembly having first and second windings electrically and magnetically coupled to each other, with a common connection between the first and second windings, means including a precharge conductor for supplying a commutating potential, a first commutating capacitor coupled to said common connection, a second commutating capacitor, and a first inductor, coupled between said common connection and the second commutating capacitor and further coupled to said precharge conductor to complete a charging circuit for the first and second commutating capacitors, such that in the commutation of the SCR, the first commutating capacitor initially discharges through one of the commutating choke windings, and thereafter the second commutating capacitor discharges through the inductor and said one winding of the commutating choke.

10. An inverter circuit as claimed in claim 9, further comprising a third commutating capacitor, and a second inductor, coupled between said third commutating capacitor and the common connection between the first inductor and the second commutating capacitor, further to reduce the amount of energy required to commutate the SCR.